United States Patent [19]

Hellmer

[11] 4,373,621

[45] Feb. 15, 1983

[54] DRIVE MECHANISM EMPLOYING WRAPPED-SPRING CLUTCH AS RADIAL LOAD-BEARING MEANS

[76] Inventor: George A. Hellmer, 212 Thomas Ave., Maquoketa, Iowa 52060

[21] Appl. No.: 204,742

[22] Filed: Nov. 7, 1980

[51] Int. Cl.³ .................... F16D 13/02; F16D 13/08
[52] U.S. Cl. .................... 192/81 C; 192/26; 192/110 B
[58] Field of Search ........... 192/81 C, 41 S, 110 B, 192/56 C, 33 C, 84 T, 26; 433/105

[56] References Cited

U.S. PATENT DOCUMENTS

| 677,872 | 7/1901 | Locke | 192/81 C |
|---|---|---|---|
| 989,102 | 4/1911 | Allen | 192/81 C |
| 1,255,547 | 2/1918 | Maynard | 192/26 |
| 2,356,835 | 8/1944 | Duckett | 192/81 C X |
| 2,360,187 | 10/1944 | Almen | 192/81 C |
| 3,395,553 | 8/1968 | Stout | 192/41 S X |
| 3,483,955 | 12/1969 | Schell et al. | 192/41 S |
| 3,494,451 | 2/1970 | Mallory et al. | 192/41 S |
| 3,920,106 | 11/1975 | Nisenson | 192/26 X |
| 3,926,286 | 12/1975 | Johnson | 192/26 X |
| 4,235,133 | 11/1980 | Acevedo | 192/41 S X |

FOREIGN PATENT DOCUMENTS 46-30217 9/1971 Japan ..................... 192/26

OTHER PUBLICATIONS

R. D. Lowery/A. W. Mehrbrodt–Machine Design–"How To Do More With Wrapped–Spring Clutches", pp. 78–82; Jul. 22, 1976 Issue.

Primary Examiner—Rodney H. Bonck
Attorney, Agent, or Firm—Henderson & Sturm

[57] ABSTRACT

A drive mechanism comprises a rotatable member, such as a shaft, having an axially elongated cylindrical outer surface, a second member or shaft having an axially elongated cylindrical inner surface loosely telescoped over the outer surface so as to provide an axially elongated annular space within which is contained a wrapped-spring clutch so arranged as to serve as radial load-bearing means when the clutch is disengaged whereby to journal one member on the other.

5 Claims, 4 Drawing Figures

DRIVE MECHANISM EMPLOYING WRAPPED-SPRING CLUTCH AS RADIAL LOAD-BEARING MEANS

BRIEF SUMMARY OF THE INVENTION

Wrapped-spring clutches for selective engagement and disengagement between coaxial members have been known in the prior art for several years and, because of their low-cost, space-saving features and minimum maintenance requirements, have been employed in a wide variety of applications. A relatively comprehensive treatment of this type of clutch appears at pages 78–82 of "Machine Design" of July 22, 1976. Another characteristic of such clutches, as pointed out in the source just noted, is its quick releasability, making it eminently suitable for hand-release in relatively low-load situations where release and re-engagement occur rather frequently.

One such situation, and as illustrated herein by way of example, is use of the clutch in dental laboratories where the drive mechanism includes a chuck for selectively receiving several different tools; e.g., drills, grinders, etc. In such case, an outer sleeve is easily adapted to be grasped by hand to discontinue drive to the driven chuck for enabling speedy interchange of tools, it being clear that when the sleeve is so grasped, the wrapped-spring clutch is disengaged and the driving member continues to run while the chuck and tool are stopped. Release of the sleeve causes re-engagement of the clutch easily and rapidly.

The improvement achieved by the present invention is the employment of the clutch spring as a radial load-bearing means between the driving and driven members to journal the two members for relative rotation when the sleeve is grasped to effect disengagement of the clutch. Such use of the spring eliminates costly anti-friction bearings such as bushings, needle bearings and the like. The spring is formed of a helically-wound ribbon-like strip of material that is effective to achieve both spring and bearing characteristics, such as phosphor-bronze, for example. Thus, the spring accomplishes its known function as well as a new function and does so inexpensively and efficiently.

DETAILED DESCRIPTION OF A PREFERRED EMBODIMENT OF THE INVENTION

Figure 1:
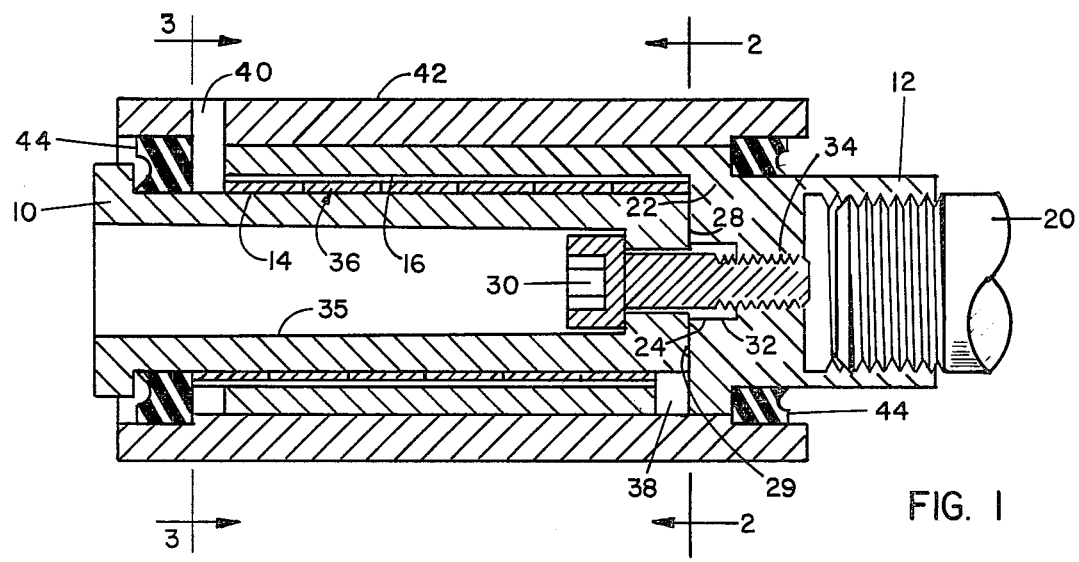
FIG. 1 is a longitudinal section, greatly enlarged over actual size, of a typical drive employing the invention.
Figure 2:
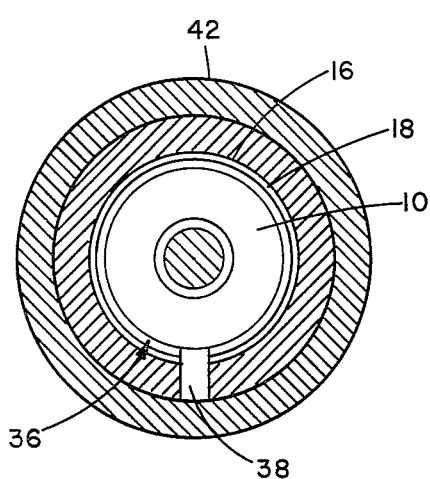
FIG. 2 is a cross-section on the line 2—2 of FIG. 1.
Figure 3:
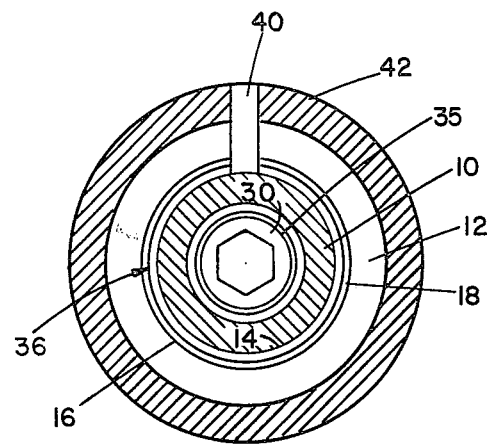
FIG. 3 is a section on the line 3—3 of FIG. 1.
Figure 4:
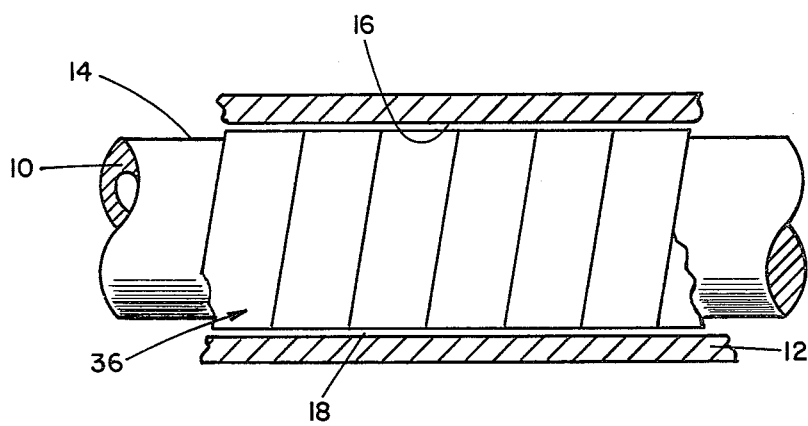
FIG. 4 is a fragmentary view, partly in section and partly in elevation, showing an intermediate portion of the spring and its bearing relation to the driving and driven members.

As previously noted herein, the driving mechanism is adapted for use in a dental laboratory wherein the source of driving power is a lathe or the like (not shown). This lathe conventionally drives a rotatable driving member 10, which is here shown as partly hollow for at least two purposes; first to form a connection to the lathe, and second to enable axial connection to a driven member 12. The driving member has an axially elongated cylindrical outer surface 14, and the driven member has an axially elongated cylindrical inner surface 16 loosely telescoped over or concentric with the surface 14, thus leaving or providing an elongated annular space 18.

The driven member may be axially extended in any suitable manner, as by a coaxial threaded connection element 20 to receive or serve as a chuck or other suitable means (not shown) or interchangeably receiving a variety of tools (also not shown). The driven member has a radial wall 22 formed with a central circular opening 24. The junction of the radial wall 22 and the front interior radial wall face 29 of the adjacent end of the driving member provide a thrust bearing face 28, and a suitable fastening means, such as an Allen head screw 30 extends axially through an opening 32 in the driving member end and is threaded into the driven member at 34. The connection thus established prevents axial separation of the members but transmits no torque and permits relative rotation between the two when the clutch, about to be described, is disengaged. The driving member is interiorly hollow, as by having an axial bore 35 opening at its rear or outer terminal end so as to facilitate insertion of the screw 30.

The wrapped-spring clutch is designated as a whole by the numeral 36 and is contained in the annular space 18. This spring comprises a one-piece ribbon-like strip of material, such as metal wound as a helix as is typical of wrapped-spring clutches. Thus, the coils of the spring are flat rather than of cylindrical section as is the case in some springs wound from music wire. A flat spring has better clutching properties and, in the present case, where the spring serves also as a bearing, it has better bearing qualities, especially when composed of material that possesses the characteristics or qualities of both a spring and a bearing; e.g., phosphor-bronze and the like.

One end of the spring, here its front or right-hand end as seen in the drawing, is connected, as by a pin 38, to the driven member 12. The opposite or rear end of the spring is connected, as by a pin 40, to an outer sleeve 42 or collar journalled on the exterior cylindrical surface of the driven member. As is typical of clutches of this type, the spring normally has an interference fit about the outer surface 14 of the driving member and its radial dimension measured across the section of a coil is slightly less than the radial dimension of the corresponding section of the annular space so that there is room for the spring to expand radially when the sleeve 42 is grasped, as will become apparent immediately following. The spring also has room for slight axial expansion as its coils are released from the outer surface of the driving member. Appropriate seals 44 are used at opposite ends of the assembly.

In operation, and assuming the sleeve 42 is free to rotate, the entire assembly rotates as a unit, because the normal tendency of rotation of the parts increases the grip of the clutch spring coils about the outer surface 14 of the driving member and the spring, being pinned at 38 to the driven member, is thus engaged to drive the driven member. When the sleeve 42 is grasped, the grip of the coils of the clutch spring about the driving member outer surface 14 is relaxed and the spring expands axially as well as radially within the limits permitted by the annular space 18, which limits here are calculated on the basis of a normal bearing clearance when the spring is relaxed. In this condition, the spring serves, then, as a radial load-bearing means between the rotating driving member and the now non-rotating driven member, the interior of the spring and the surface 14 providing the bearing. The sleeve of course is still held in the grasp of the user, or otherwise if desired, while tools are interchanged in the driven member. As soon as the sleeve is released, the spring re-engages and drive continues. The mass and inertia of the sleeve desirably retard re-engagement as to avoid shock loading.

A desirable and efficient bearing is afforded when the entire length of the spring is used as the bearing. For this purpose, the entire outer surface 14 of the driving member is formed as a bearing surface area, preferably by a suitable machining operation. Likewise, the interior of the spring is polished to a surface suitable for use as a bearing. The use of the spring as a bearing eliminates additional bearings between the driving and driven members and simplifies the design, manufacture and maintenance of the assembly. Further features will have become apparent to those skilled in the art as will many modifications and alterations in the preferred embodiment shown and described, all without departure from the spirit and scope of the invention.

I claim:

1. An externally-controlled, wrapped-spring clutch mechanism including a first rotatable member having an axially elongated cylindrical outer surface, a second rotatable member having an axially elongated cylindrical inner surface loosely telescoped over the first member outer surface so as to provide an axially elongated annular space between the two surfaces, a control element externally of and coaxial with the members, a coiled clutch spring contained within the annular space and wrapped around the first member and pre-loaded into engagement with the first member outer surface whereby one member drives the other, and said spring having axially opposite ends one of which is connected to the second member and the other of which is connected to the control element whereby the control element is selectively operative to relax the spring to discontinue drive between the members for enabling free relative rotation of the members, characterized in that the entire outer surface is formed as a minimum-friction bearing surface and the entire inner surface of the spring is formed as a minimum-friction helical bearing surface cooperative with the outer surface bearing area to freely inter-journal the two members for relative rotation when the control element is operated to relax the spring, said bearing surfaces comprising the sole radially-effective inter-journalling means between the members.

2. The clutch mechanism of claim 1, further characterized in that the second member has a cylindrical exterior and the control element is a sleeve journalled on said surface.

3. The clutch mechanism of claim 2, further characterized in that the sleeve is configured to be grasped by a person's hand to cause relaxing of the spring and the remainder of the parts are of light-weight and small-size construction enabling a person to grasp the sleeve and hold the mechanism in his sleeve-grasping hand while the members rotate relative to each other.

4. The clutch mechanism of claim 1, further characterized in that the members respectively have interior radial walls having opposed radial faces meeting to form an axial thrust bearing between the members, a non-torque-transmitting means is contained within the first member and interconnects the members at said radial walls to prevent axial separation thereof.

5. The mechanism of claim 4, further characterized in that the first member has an axial bore opening at an end remote from the non-torque-transmitting means and leading to said means to provide access thereto.

* * * * *